Patented Oct. 24, 1922.

1,433,100

UNITED STATES PATENT OFFICE.

SAMUEL S. SADTLER, OF PHILADELPHIA, PENNSYLVANIA, ASSIGNOR TO ESSEX SPECIALTY CO., INC., OF BERKLEY HEIGHTS, NEW JERSEY, A CORPORATION OF NEW JERSEY.

PHOSPHORUS COMPOUND.

No Drawing. Application filed December 22, 1921. Serial No. 524,256.

*To all whom it may concern:*

Be it known that I, SAMUEL S. SADTLER, a citizen of the United States, residing at Philadelphia, in the county of Philadelphia and State of Pennsylvania, have invented certain new and useful Improvements in Phosphorus Compounds; and I do hereby declare the following to be a full, clear and exact description of the invention, such as will enable others skilled in the art to which it appertains to make and use the same.

This invention relates, generally, to a novel phosphorus composition, and to a method or process of producing the same.

The preparation and use of compositions or products containing phosphorus as an essential ingredient for industrial and other purposes (as in the art of manufacturing matches, pyrotechnical devices, and similar products) entails the disadvantage that, in the presence of air, the phosphorus by oxidizing gives off irritating acid fumes, which not only have a very injurious effect upon the health of the workmen engaged in preparing and handling the same, but are also very unpleasant and annoying.

I have discovered that the usual giving off of acid fumes due to oxidization of the phosphorus may be prevented without detriment to the effectiveness of the phosphorus for industrial purposes; therefore, this invention has for its principal object to provide a novel non-fuming phosphorus composition, and, as a further object, to provide a novel method or process of producing such composition.

To the above-stated ends this invention comprises a composition consisting of an admixture of phosphorus with certain organic bases of high boiling point, said organic bases being of a nature adapted to take up or absorb the fumes of phosphoric oxide as formed and to neutralize them, while serving at the same time to protect the phosphorus against too ready an oxidization.

As an example of the character of the organic bases, adapted to serve the stated purposes, may be mentioned a-naphthylamine and dimethylaniline, although I do not wish to confine the invention entirely to the use of these particular substances, but broadly claim the use of any organic base or bases capable of combining with phosphoric oxide fumes.

Broadly stated, the novel non-fuming phosphorus composition consists of an admixture of 32 parts of phosphorus, 2 parts of a-naphthylamine and 4 parts of dimethylaniline. To mask the slight odor of the organic bases a small quantity of a fragment essential oil, such as oil of sassafras, may be added to the composition.

The method of producing the composition is as follows:—

For convenience of admixing the phosphorus is melted by warming. I sometimes add a small quantity of sulphur to the phosphorus, which tends to maintain the phosphorus in liquid condition, although the composition may be made without the sulphur if desired. When the phosphorus is liquefied I add the liquid organic bases, a-naphthlyamine and dimethylaniline.

More in detail, and as an illustration of a practical composition for match making purposes and the like, having the ingredients combined in relative proportions adapted to give generally satisfactory results, I take 32 parts of phosphorus and melt the same together with 5 parts of sulphur; after the liquefied phosphorus is thus produced, the same is allowed to cool, whereupon I add to and intermix therewith 2 parts of a-naphthylamine and 4 parts of dimethylaniline. The resulting mixture or composition can be preserved without any development of white fumes, or so called phosphorus odor, such fumes being absorbed as soon as formed by the organic bases used, to wit, the a-naphthylamine and the dimethylaniline.

I do not wish to confine myself to the use of the two organic bases hereinbefore mentioned, but may use other organic bases of sufficiently high boiling-point as not to vaporize too readily while in admixture with the phosphorus. nor do I wish to confine myself to the exact proportions of the ingredients of the composition since in this respect more or less variation is possible.

The composition such as I have described may be used by itself or in admixture with chlorate of potash and the other ingredients usually employed for match making compositions and certain types of pyrotechnical devices. What I have sought to accomplish by the present invention is to provide a form of phosphorus, which may be effectively used as the essential active part of any finished match composition, and of some pyrotechnical preparations, but which is rendered safer and less injurious in the industrial handling thereof, thereby greatly improving the conditions of the manufacture of such classes of products.

I claim:—

1. A non-fuming phosphorus composition consisting of phosphorus admixed with an organic base of high boiling-point.

2. A non-fuming phosphorus composition consisting of phosphorus admixed with organic bases adapted to absorb and neutralize phosphoric oxide fumes.

3. A non-fuming phosphorus composition consisting of an admixture of phosphorus with organic bases of high boiling-point and adapted to absorb and neutralize phosphoric oxide fumes.

4. A composition for the purposes described comprising phosphorus, a-naphthylamine and dimethylaniline.

5. A composition for the purposes described comprising 32 parts of phosphorus, 2 parts of a-naphthylamine and 4 parts of dimethylaniline.

6. A method of producing a non-fuming phosphorus composition consisting of liquefying phosphorus and then admixing therewith organic bases of high melting point adapted to absorb and neutralize phosphoric oxide fumes.

7. A method of producing a non-fuming phosphorus composition consisting in melting a mass of phosphorus and then admixing therewith an amount of a-naphthylamine approximately equivalent to $\frac{1}{16}$ of the mass of phosphorus, and admixing therewith an amount of dimethylaniline approximately equivalent to $\frac{1}{8}$ of the mass of phosphorus.

8. A method of producing a non-fuming phosphorus composition consisting of melting 32 parts of phosphorus with 5 parts of sulphur; cooling the liquefied product, and then intermixing therewith 2 parts of a-naphthylamine and 4 parts of dimethylaniline.

In testimony, that I claim the invention set forth above I have hereunto set my hand this ninth day of December, 1921.

SAMUEL S. SADTLER.

Witnesses:
R. W. Fister.
T. P. Telta, Jr.